United States Patent [19]

MacDonald

[11] 4,201,281

[45] May 6, 1980

[54] ELECTROMAGNETIC CLUTCH HAVING A CONTRACTIBLE FRICTION SHOE

[75] Inventor: J. G. Fraser MacDonald, Rockford, Ill.

[73] Assignee: Warner Electric Brake & Clutch Company, South Beloit, Ill.

[21] Appl. No.: 908,354

[22] Filed: May 22, 1978

[51] Int. Cl.$^2$ .................... F16D 13/08; F16D 27/10
[52] U.S. Cl. ........................ 192/35; 192/40; 192/48.2; 192/48.3; 192/80; 192/81 C; 192/84 T
[58] Field of Search ............... 192/35, 37, 40, 84 T, 192/79, 84 C, 80, 48.2, 48.3, 81 C

[56] References Cited

U.S. PATENT DOCUMENTS

| | | | |
|---|---|---|---|
| 3,040,856 | 6/1962 | Shoquist | 192/40 X |
| 3,095,071 | 6/1963 | Mason | 192/40 X |
| 3,149,706 | 9/1964 | Mason et al. | 192/35 |
| 3,171,523 | 3/1965 | Shoquist | 192/81 |
| 3,255,855 | 6/1966 | Peras | 192/48.3 X |
| 3,598,210 | 8/1971 | Barr | 192/38 |
| 3,685,622 | 8/1972 | Baer et al. | 192/35 |

*Primary Examiner*—Rodney H. Bonck
*Attorney, Agent, or Firm*—Leydig, Voit, Osann, Mayer & Holt, Ltd.

[57] ABSTRACT

Torque is transmitted between the driving and driven members of the clutch by a helical spring and a friction shoe. When an electromagnet is excited, pilot torque is applied to the spring to cause the spring to clamp downwardly around the shoe and cause the shoe to contract radially around the driving member and transmit torque to the driven member. The driving member, the driven member, the spring and the friction shoe are arranged in such a manner that the spring effects soft engagement of the clutch while amplifying the pilot torque sufficiently to enable a relatively small and light weight clutch to produce ample output torque.

11 Claims, 7 Drawing Figures

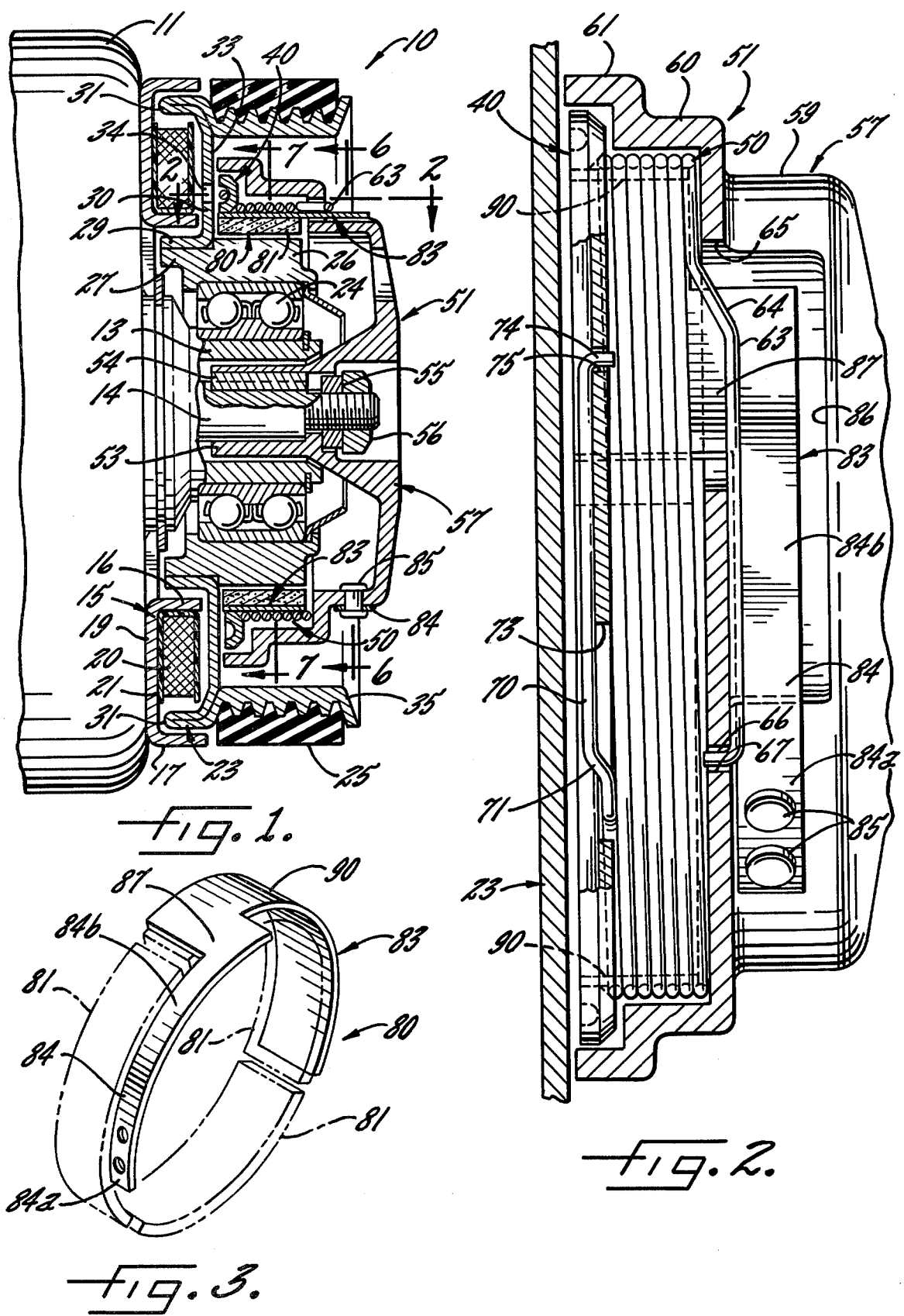

ELECTROMAGNETIC CLUTCH HAVING A CONTRACTIBLE FRICTION SHOE

BACKGROUND OF THE INVENTION

This invention relates to a normally disengaged electromagnetic friction clutch of the type in which a rotatable driving member with a generally cylindrical hub is adapted to be coupled to a driven member when a shoe is contracted radially into frictional gripping engagement with the hub. The shoe is surrounded by a helically coiled spring having one end connected to the driven member and having an opposite or armature end which is adapted to be attracted axially into engagement with the rotatable driving member when an electromagnet is excited. As an incident thereto, pilot torque is transmitted magnetically between the driving member and the armature end of the spring to turn the armature end of the spring through a short distance. This causes the coils of the spring to wrap down around the shoe and contract the shoe into frictional gripping engagement with the hub of the driving member. The shoe thus rotates with the hub and transmits torque to the driven member.

The pilot torque which is transmitted magnetically between the driving member and the armature end of the spring is of relatively small magnitude and is transferred directly through the spring to the driven member. The pilot torque is amplified, however, by the action of the spring wrapping downwardly around and contracting the shoe and thus a high percentage of the total transmitted torque is transferred between the driving and driven members by way of the shoe.

Clutches of this general type are disclosed in Mason U.S. Pat. No. 3,149,706 and Baer U.S. Pat. No. 3,685,622. In the Mason clutch, the shoe is rotatable relative to the driven member and the helical spring and causes the spring to self-energize. In other words, the spring frictionally engages the shoe and wraps down even more tightly than the wrap which is effected by the magnetic pilot torque between the driving member and the armature end of the spring. As a result, the torque which is transmitted directly through the spring is greater than the pilot torque and is not controlled solely by the pilot torque.

Self-energization of the helical spring also occurs in the Baer clutch. In that clutch, the spring wraps down around the driving hub as well as around the shoe. Frictional engagement of the spring with the driving hub causes the spring to wrap more tightly than the wrap which is produced by the magnetic pilot torque and thus the torque which is transmitted directly through the spring is greater than and is not directly related to the pilot torque.

In a conventional helical spring clutch in which the spring spans the gap between the driving and driven members, the first coil of the spring wraps downwardly on and engages the driving member with high friction and increases the torque in the remaining coils which surround the driving member. Accordingly, the next coil wraps downwardly even tighter on the driving member and increases the torque in the remaining coils still further. The last coil which surrounds the driving member is subjected to the highest torque. Thus, the maximum torque which can be transmitted by the clutch is limited by the torque which can be carried by the last coil on the driving member.

SUMMARY OF THE INVENTION

The general aim of the present invention is to provide a new and improved electromagnetic friction clutch in which the driving member, the driven member and a contractible shoe are uniquely arranged with respect to a helical spring or the like, the spring amplifying the magnetic pilot torque in novel manner so as to enable a relatively light and low cost spring to achieve substantial torque amplification without producing high torque peaks during initial engagement of the clutch and without imposing high radial and axial thrust loads on the driving and driven members.

Another object of the invention is to provide a clutch in which the shoe rotates with the driven member and in which the spring wraps down on the shoe with low friction and in such a manner that each succeeding coil of the spring amplifies the magnetic pilot torque and produces a clamping force on the shoe so as to enable the total output torque to substantially exceed the maximum torque which is imposed on the spring.

A more detailed object is to provide a clutch having a helical spring which is prevented from any substantial self-energization so that the torque transmitted directly through the spring is controlled primarily by the magnetic torque and is limited to a magnitude which is substantially proportional to the magnetic torque.

Still another object of the invention is to prevent any substantial self-energization of the spring by coupling the spring, the shoe and the driven member for rotation in unison and by uniquely utilizing the shoe to hold the spring out of frictional engagement with the hub of the driving member.

A further object is to couple the shoe to the driven member in a novel manner to enable the shoe to comply with and compensate for any eccentricity between the driven member and the hub of the driving member.

The invention also resides in the provision of unique springs which transmit torque between the shoe and the driven member while enabling the shoe to contract radially around and to comply with the hub of the driving member, the springs also serving to hold the shoe out of engagement with the hub when the clutch is disengaged.

These and other objects and advantages of the invention will become more apparent from the following detailed description when taken in conjunction with the accompanying drawings.

BRIEF DESCRIPTION OF THE DRAWINGS

FIG. 1 is a substantially diametrical sectional view of a new and improved electromagnetic friction clutch incorporating the unique features of the present invention, the view being taken substantially along the line 1—1 of FIG. 6.

FIG. 2 is an enlarged fragmentary cross-section taken substantially along the line 2—2 of FIG. 1.

FIG. 3 is a perspective view of part of the shoe.

DETAILED DESCRIPTION OF THE PREFERRED EMBODIMENT

Figure 6:
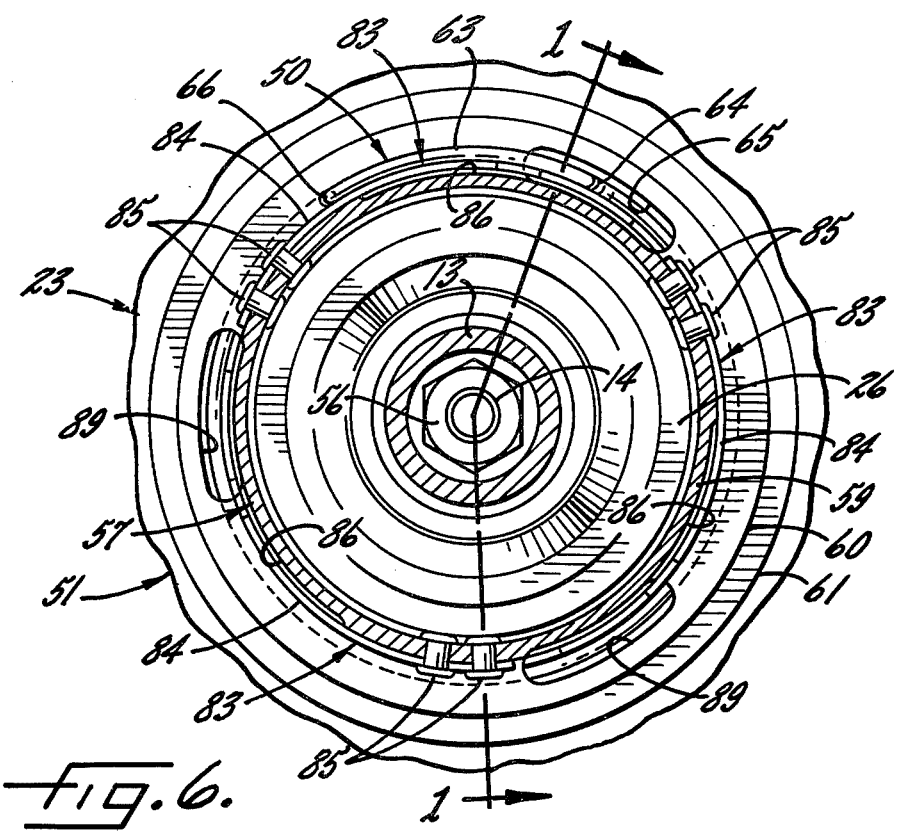
FIGS. 6 and 7 are cross-sections taken substantially along the lines 6—6 and 7—7, respectively, of FIG. 1.

For purposes of illustration, the electromagnetic friction clutch 10 of the invention is shown in the drawings as being used in conjunction with an automobile air conditioning compressor 11. The compressor includes a tubular nose 13 for mounting the clutch and further includes a drive shaft 14 which extends through the nose and which is adapted to be rotated in a clockwise direction (FIG. 6).

The clutch 10 includes an electromagnet having an annular magnet core 15 rigidly secured to the end of the compressor 11 and having a substantially U-shaped radial cross-section. Thus, the core includes an axially extending inner pole ring 16, an axially extending outer pole ring 17, and a radially extending bridge 19 which spans the two pole rings. A multiple turn winding 20 is secured within a U-shaped bobbin 21 which, in turn, is fastened to the outer side of the inner pole ring 16.

An input or driving member in the form of an annular rotor 23 is rotatably journaled on the nose 13 of the compressor 11 by a ball bearing 24 and is adapted to be driven from the engine of the vehicle by an endless belt 25. The rotor 23 comprises a tubular hub 26 which is fastened to the outer race of the bearing 24, the hub being of circular cross-section and having a rear end portion 27 (FIG. 4) of reduced diameter. Secured rigidly to the rear end portion 27 of the hub 26 is an inner pole ring 29 made of magnetic material and having a forward end which defines a radially extending pole face 30. An outer pole ring 31 (FIG. 1) is formed integrally with the inner pole ring 29 and includes a forward end which defines a second radially extending pole face 33. The two pole faces are magnetically isolated from one another by several arcuate slots 34 which are spaced angularly around the rotor 23. A grooved pulley 35 (FIG. 1) is formed integrally with the outer pole ring 31 and is adapted to receive the endless belt 25. When the latter is driven, the pulley 35, the pole rings 29 and 31 and the hub 26 all rotate around the bearing 24.

The inner pole ring 29 of the rotor 23 is spaced inwardly from the inner pole ring 16 of the magnet core 18 while the outer pole ring 31 of the rotor is located between the winding 20 and the outer pole ring 17 of the core. When the winding 20 is excited by a voltage source, magnetic flux is produced and threads through the core 15 and the rotor 23 and across the various gaps between the pole rings. The flux path and the nature of the controlled flux transfer between the core 15 and the rotor 23 are explained in detail in Newton et al U.S. application Ser. No. 860,582, filed Dec. 14, 1977 and assigned to the same assignee as the present invention.

An armature 40 (FIG. 4) is disposed in opposing relation with the pole faces 30 and 33 defined by the forward ends of the pole rings 29 and 31 of the rotor 23. In this particular instance, the armature is in the form of a continuous ring having a generally U-shaped radial cross-section with the open end of the U facing the pole faces 30 and 33 of the rotor 23 and alined radially with the slots 34. One leg 41 of the U defined by the armature is disposed in opposing relation with the pole face 30 while the other leg 42 opposes the pole face 33. The armature 40 normally is urged to a released position (FIG. 4) in which the legs 41 and 42 of the armature are separated from the pole faces 30 and 33 by narrow axial air gaps. Upon excitation of the winding 20, the flux cuts across the air gaps to magnetically attract the armature 40 into engagement with the pole faces 30 and 33 and to cause the armature to turn with the rotor 23 (see FIG. 5).

Engagement of the armature 40 with the pole faces 30 and 33 causes a helically coiled spring 50 to transmit torque from the rotor 23 to the drive shaft 14 of the compressor 11 by way of an output or driven member 51 which forms part of the clutch 10. In this instance, the driven member includes a sleeve 53 (FIG. 1) which is telescoped into the compressor nose 13 and over the compressor drive shaft 14. The sleeve 53 is keyed to the shaft 14 at 54 and is retained on the shaft by a thrust washer 55 and a nut 56.

Formed integrally with the sleeve 53 of the driven member 51 is a cup-shaped hub 57 (FIG. 2) of circular cross-section and having an outer periphery defined by three radially stepped sections 59, 60 and 61 of progressively larger diameter. The hub section 59 of smallest diameter is spaced forwardly of the hub 26 of the rotor 23 while the intermediate hub section 60 substantially surrounds the rotor hub. The third hub section 61 extends around the armature 40.

The helical spring 50 is located primarily within the two rear sections 60 and 61 of the driven hub 57 and its forwardmost coil 63 is bent as indicated at 64 in FIG. 2 so that such coil may extend through a slot 65 (FIGS. 2 and 6) formed in the step between the hub sections 59 and 60 and may overlie the outer periphery of the hub section 59. At its free end, the forwardmost coil is formed with a reversely bent tang 66 which is captivated within a hole 67 in the step between the hub sections 59 and 60. Accordingly, the spring 50 and the driven hub 57 are positively coupled to rotate as a unit.

As shown in FIG. 2, the rearmost coil 70 of the spring 50 is bent as indicated at 71 and extends through a slot 73 in the armature 40. A tang 74 is formed on the free end of the rearmost coil 70 of the spring and projects into a hole 75 in the armature. The spring thus is coupled to rotate with the armature. Rather than using a separate armature 40, the rearmost coil 70 of the spring itself could serve as an armature and could be drawn directly into engagement with the rotor 23.

When the winding 20 is excited to draw the armature 40 into engagement with the rotor 23, the armature and the spring 50 are rotated in the same direction as the rotor, torque is transmitted through the spring to the driven member 51 and thus the driven member also is rotated. In addition, the rearmost coil 70 of the spring is turned clockwise (FIG. 6) relative to the forwardmost coil 63 of the spring and causes the spring to contract or wrap down. As the spring wraps down, it contracts a shoe 80 radially into frictional engagement with the driving hub 26 and, as an incident thereto, torque also is transmitted from the rotor to the driven member 51 by way of the shoe.

In accordance with one feature of the present invention, the shoe 80 is arranged so as to prevent the spring 50 from self-energizing and serves to limit the torque which is transmitted directly through the spring to a value which is substantially proportional to the magnetic torque resulting from engagement of the armature 40 with the rotor 23. This is achieved by (1) coupling the shoe 80 to the driven member 51 to cause the shoe to rotate in unison with the driven member and the spring 50 and (2) utilizing the shoe as a spacer between the spring and the driving hub 26 to keep the inner side of the spring out of engagement with the hub along the full length of the spring and at all times. With this arrangement, neither the shoe 80 nor the input hub 26 is capable of exerting torque on the spring 50 in such a manner as to cause the spring to self-energize or to wrap down more tightly than the wrap which is effected as a result of engagement of the armature 40 with the rotor 23. The torque which is transmitted directly through the spring 50 thus is controlled and is limited to a value which is proportional to the magnetic torque between the rotor 23 and the armature 40. As will be explained subsequently, controlling and limiting of the torque which is transmitted directly by the spring produces several advantages over prior electromagnetic wrap spring shoe clutches.

In this particular instance, the shoe 80 includes three arcuate bands 81 (FIGS. 3 and 7) of suitable friction material such as brake lining. Each band spans an arc of about 115 degrees. The bands encircle the driving hub 26 and loosely surround the hub when the clutch 10 is disengaged (see FIG. 4).

Figure 7:
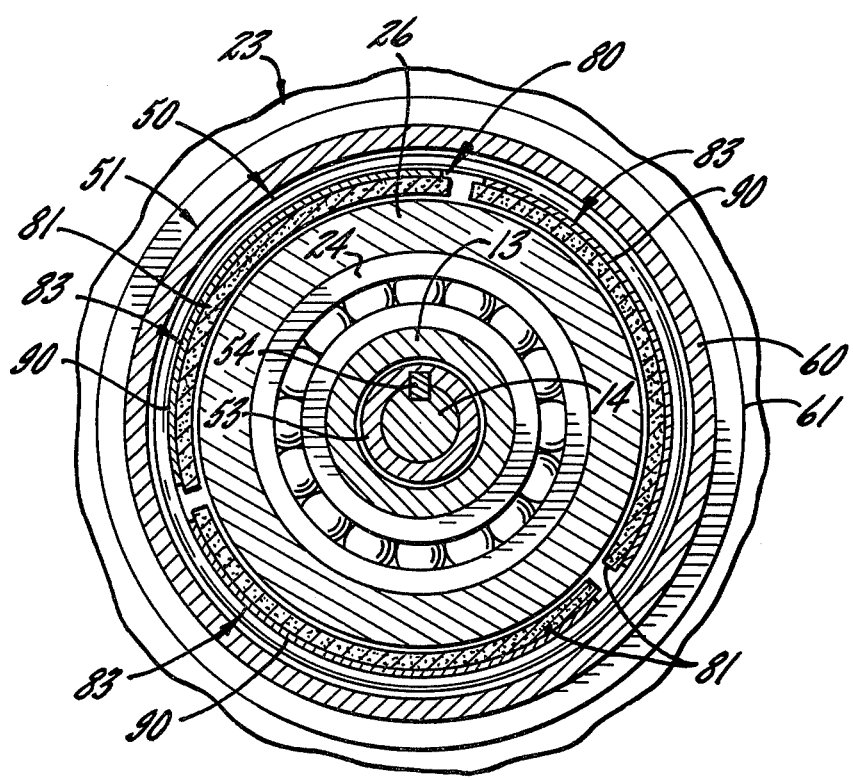

The bands 81 are coupled to rotate positively in unison with the driven member 51 and to contract radially around the driving hub 26 by unique leaf springs 83 (FIGS. 2 and 3), portions of which constitute part of the shoe and other portions of which constitute radially flexible means for coupling the shoe to the driving member. Herein, three such springs are spaced angularly around the driven member 51 as shown in FIGS. 6 and 7. Each spring includes an arcuate mounting section 84 (FIG. 3) of relatively narrow axial width and having a trailing end portion 84a which is secured rigidly by rivets 85 (FIG. 2) to the outer periphery of the forewardmost section 59 of the hub 57 of the driven member 51. The leading end portion 84b of the spring section 84 defines a cantilever which is free to flex radially relative to the trailing end portion 84a and, for this purpose, a recess 86 (FIGS. 2 and 6) is formed in the outer periphery of the hub section 59 and underlies the leading end portion of the spring section 84.

Formed integrally with the leading end portion 84b of the mounting section 84 of each leaf spring 83 is an intermediate section 87 (FIG. 3) which extends axially or rearwardly from the mounting section and which spans the axial gap between the hub section 59 and the friction bands 81. The intermediate section 87 of one leaf spring 83 extends rearwardly through the same slot 65 which receives the end coil 63 of the helical spring 50. Two additional slots 89 (FIG. 6) are formed through and are spaced around the step between the hub sections 59 and 60 and receive the intermediate sections 87 of the other two leaf springs 83. Each of the recesses 86 in the forward hub section 59 continues beneath the intermediate section 87 of the respective spring 83 to permit the intermediate section to deflect radially.

Each leaf spring 83 is completed by a second arcuate section 90 (FIG. 3) which extends around and is bonded or otherwise rigidly secured to a friction band 81. The second section 90 of each leaf spring 83 is offset axially or rearwardly from its respective mounting section 84 and is disposed in leading relationship with respect to the leading end portion 84b of the mounting section. The sections 90 of the three leaf springs 83 are telescoped within the helical spring 50 (see FIG. 4) and are substantially coextensive with the friction bands 81.

Being so arranged, the leaf springs 83 serve as a rigid angular coupling between the friction bands 81 and the driven member 51 and yet are capable of flexing radially so as to permit the friction bands to contract around the driving hub 26 when the helical spring 50 is wrapped down. Moreover, the leaf springs 83 allow the friction bands to comply radially with the driving hub 26 and compensate for any eccentricity which might exist between the driving hub and the forward section 59 of the driven member 51. When the helical spring is relaxed, the leaf springs relax and urge the friction bands outwardly from the hub 26 so as to provide running clearance between the friction bands and the hub.

To summarize, the shoe 80, in this particular instance, is defined by the friction bands 81 and by the sections 90 of the leaf springs 83. The friction bands are rigid with the spring sections 90 and are telescoped over the driving hub 26 while the spring sections 90 are telescoped into the helical spring 50. The shoe 80 is coupled to rotate positively with the driven member 51 by the mounting sections 84 and the intermediate sections 87 of the leaf springs, the leading end portions 84b of the mounting sections permitting radial contraction of the shoe.

Figure 4:
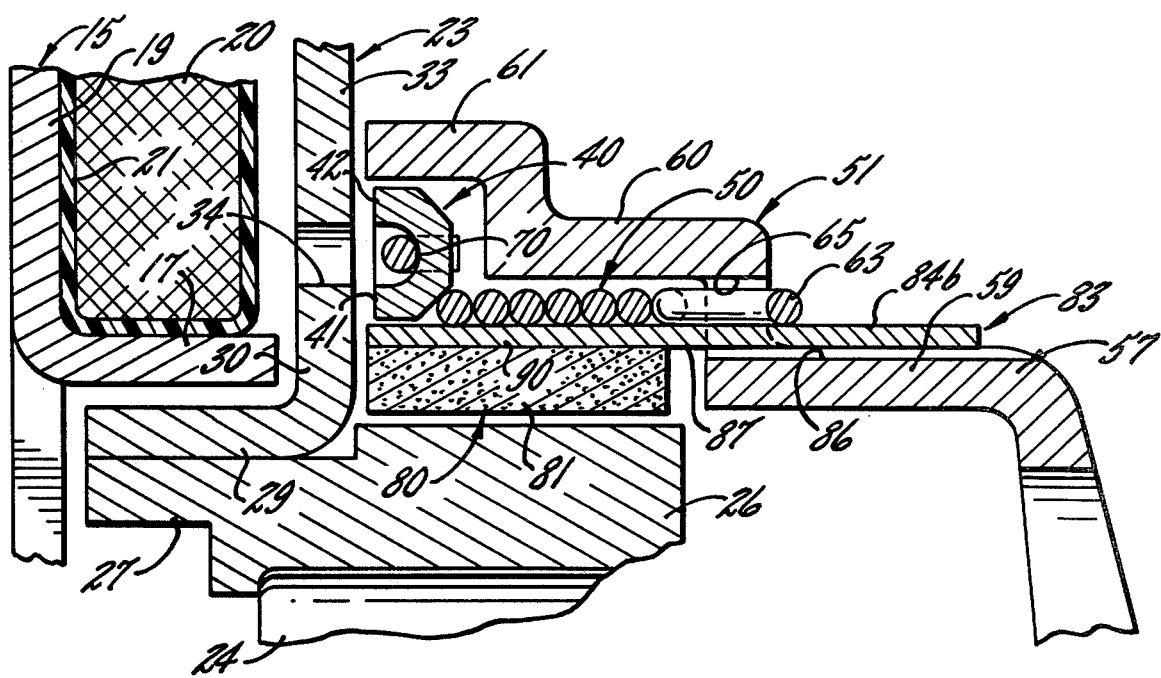
FIG. 4 is an enlarged view of parts illustrated in FIG. 1 and shows the clutch in its normally disengaged condition.
Figure 5:
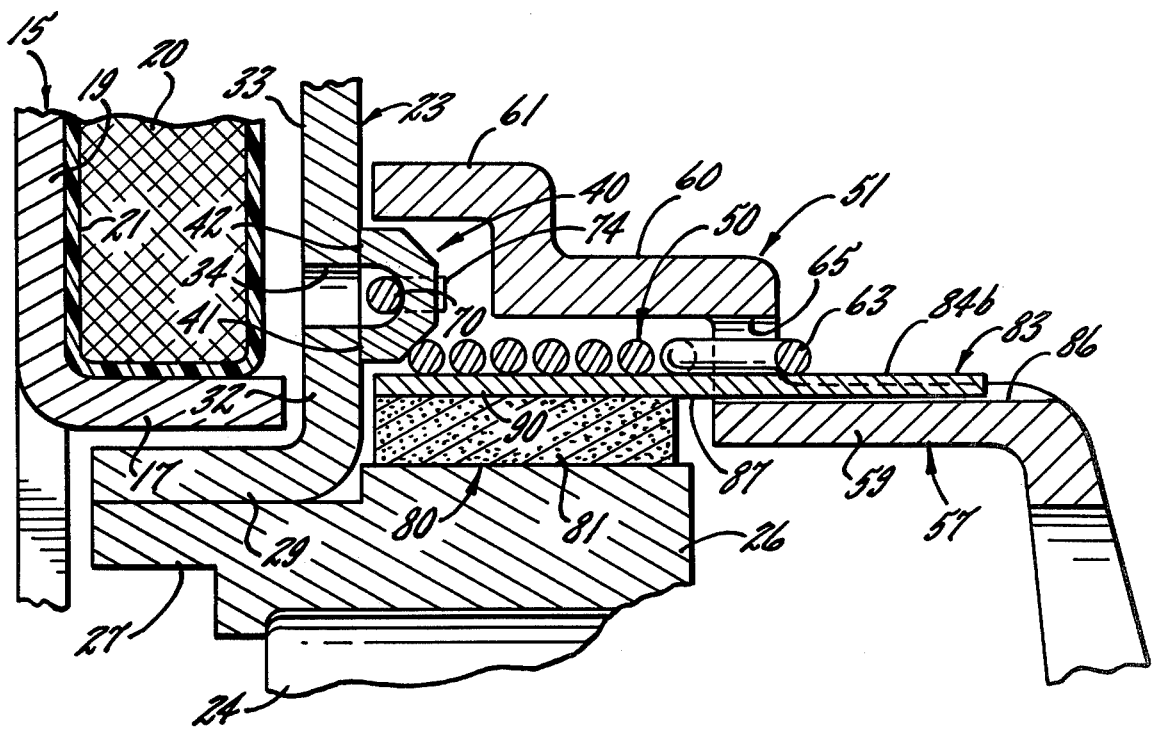
FIG. 5 is a view similar to FIG. 4 but shows the clutch in an engaged condition.

As shown in FIG. 4, the shoe 80 is virtually coextensive in an axial direction with the portion of the helical spring 50 that encircles the driving hub 26. As a result, the shoe 80 serves to keep the full length of the helical spring 50 spaced radially from and out of contact with the driving hub 26.

SUMMARY OF OPERATION

When the winding 20 is in an unexcited condition, the helical spring 50 is contracted axially but is relaxed radially and circumferentially. Thus, the helical spring 50 holds the armature 40 out of engagement with the pole faces 30 and 33 of the rotor 23 (see FIG. 4) and allows the leaf springs 83 to relax and hold the shoe 80 in an expanded condition such that the friction bands 81 are disposed in loose surrounding relation with the driving hub 26. Accordingly, rotation of the driving member or rotor 23 is not transmitted to the driven member 51 and the compressor shaft 14.

Upon excitation of the winding 20, the armature 40 is drawn axially into engagement with the pole faces 30 and 33 of the rotor 23 and causes the helical spring 50 to extend in an axial direction. When the armature begins to turn with the rotor, rotation of the rearmost coil 70 of the helical spring 50 relative to the remaining coils causes the spring to wrap down or contract in a radial direction. The spring thus contracts the friction bands 81 of the shoe 80 into frictional gripping engagement with the driving hub 26. The intermediate section 87 and the leading end portion of the mounting section 84 of each leaf spring 83 flex radially into the underlying recess 86 to permit contraction of the shoe.

Part of the torque which is transferred between the driving and driven members 23 and 51 is transmitted directly through the helical spring 50 and is substantially proportional to the magnetic torque between the armature 40 and the pole faces 30 and 31 of the driving member. The magnetic torque is amplified by virtue of the helical spring 50 wrapping down on the spring sections 90 of the shoe 80 and contracting the friction bands 81 of the shoe around the driving hub 26. The shoe does not move into radial frictional contact with the driven member 51. Thus, all of the torque which is transferred between the driving hub 26 and the driven member 51 is transferred from the hub to the friction bands, from the friction bands to the leaf springs 83 and from the leaf springs to the driven member.

Because the driven member 51, the helical spring 50 and the shoe 80 all rotate in unison, there is no substantial slippage or relative rotation between the shoe and the spring and thus the shoe is not capable of causing the spring to self-energize or wrap down more tightly than the wrap which is effected by the magnetic torque. Moreover, the shoe prevents the helical spring from engaging the driving hub 26 and self-energizing. Accordingly, the maximum load in the helical spring is limited to a value determined by the magnetic torque so as to enable the use of a small, light and low cost spring. The helical spring also wears well since there is substantially no relative rotation between the spring and the shoe.

Because the helical spring 50 cannot self-energize, the clutch 10 engages in a relatively smooth or soft manner, is not subject to high torque peaks, and is comparatively insensitive to changes in speed and inertia. As a result, the axial and radial thrust loads which are imposed on the clutch are relatively low.

It should be pointed out here that the coefficient of friction between the driving hub 26 and the friction bands 81 of the shoe 80 is relatively high (e.g., in the range of 0.30 to 0.60) whereas the coefficient of friction between the helical spring 50 and the shoe sections 90 of the leaf springs 83 is relatively low (e.g., less than 0.05). The low coefficient of friction between the helical spring 50 and the leaf springs 83 along with the particular arrangement of the helical spring relative to the leaf springs enables the helical spring to provide substantial torque amplification in relation to the torque which is imposed within the spring itself. When the helical spring begins to wrap down, the low friction between the leaf springs and the coils of the helical spring enables the coils to slide circumferentially around the leaf spring rather than engaging the leaf springs with high friction. The highest torque which is imposed on the helical spring is exerted on the rearmost coil 70 and is proportional to the magnetic pilot torque. Because of the low friction, the torque in the succeeding coils does not decay as rapidly as is the case in a high friction condition and thus more of the torque is effectively used as a radial clamping force to contract the shoe.

I claim:

1. A normally disengaged clutch comprising a rotatable driving member having a hub, a driven member rotatable about the same axis as the driving member, a radially contractible shoe surrounding said hub, resiliently yieldable coupling means connecting said shoe and said driven member for rotation in unison, said coupling means enabling radial contraction of said shoe around said hub and normally holding said shoe out of radial engagement with said hub, a helically coiled spring telescoped over said shoe and having one end secured to said driven member to rotate with the latter, means associated with said driving member and selectively operable to cause the opposite end of said spring to rotate with said driving member thereby to cause said spring to wrap down on said shoe and contract said shoe radially into frictional gripping engagement with said hub to transmit torque (1) from said hub to said shoe (2) from said shoe to said coupling means and (3) from said coupling means to said driven member.

2. A clutch as defined in claim 1 in which said resiliently yieldable coupling means comprise leaf springs, said springs being secured to and cantilevered on said driven member.

3. A clutch as defined in claim 2 in which said leaf springs include portions which are telescoped into said helical spring, the telescoped portions of said leaf springs defining part of said shoe, the coefficient of friction between said helical spring and the telescoped portions of said leaf springs being less than the coefficient of friction between said shoe and said hub.

4. A clutch as defined in claim 1 in which said resiliently yieldable coupling means comprise leaf springs, said springs having portions secured to and cantilevered on said driven member and having portions telescoped into said helical spring and defining part of said shoe, said shoe being further defined by friction material secured to the telescoped portions of said leaf springs and engageable with said hub, the coefficient of friction between said helical spring and the telescoped portions of said leaf springs being less than the coefficient of friction between said friction material and said hub.

5. A clutch as defined in claim 1 in which said resiliently yieldable coupling means comprise a plurality of angularly spaced leaf springs, each of said leaf springs comprising a first substantially arcuate section extending circumferentially around said driven member and having a trailing end portion secured to said driven member, each of said leaf springs further comprising a second substantially arcuate section formed integrally with the leading end portion of said first section and offset axially from said first section, the second section of each leaf spring defining at least part of said shoe, extending circumferentially around said hub and having a leading end portion which is disposed in leading relationship with respect to the leading end portion of the first section of the respective leaf spring.

6. A clutch as defined in claim 5 in which said driven member is of substantially circular cross-section, the trailing end portion of the first section of each of said leaf springs being secured to the outer peripheral surface of said driven member, and a recess formed in said outer surface and underlying the leading end portion of the first section of each leaf spring to permit the leading end portion of said first section to flex radially inwardly relative to the trailing end portion thereof.

7. A clutch as defined in claim 6 in which each of said leaf springs further comprises an intermediate section extending axially between the leading end portion of said first section and the trailing end portion of said second section.

8. A clutch as defined in claim 7 in which the recess which underlies the leading end portion of the first section of each leaf spring also underlies the intermediate section of such spring.

9. A normally disengaged electromagnetic friction clutch comprising a rotatable driving member having a hub, a driven member rotatable about the same axis as the driving member, a shoe telescoped over said hub, said shoe being radially contractible and normally being disposed in loose surrounding relationship with said hub, radially compliant and circumferentially stiff coupling means connecting said shoe to said driven member, said coupling means connecting said shoe and said driven member for rotation in unison while enabling radial contraction of said shoe, a flexible coiled element telescoped over said shoe and having one end secured to said driven member to rotate with the latter, an electromagnet associated with said driving member and operable when excited to attract the opposite end of said flexible element axially into engagement with said driving member thereby to cause said flexible element to wrap down on said shoe and contract said shoe radially into frictional gripping engagement with said hub to transmit torque (1) from said hub to said shoe (2) from said shoe to said coupling means and (3) from said coupling means to said driven member, said shoe being located relative to said driven member so as to be free of radial frictional engagement with said driven member at all times when said shoe is contracted whereby all of the torque transmitted from said hub to said shoe is transmitted from said shoe to said driven member through said coupling means.

10. A clutch as defined in claim 9 in which said flexible element has a plurality of coils which wrap down on said shoe and has no coils which wrap down on said hub.

11. A normally disengaged electromagnetic friction clutch comprising a rotatable driving member having a hub of circular crosssection, a driven member rotatable about the same axis as said driving member, a substantially annular shoe telescoped over said hub, said shoe being radially contractible and normally being disposed in loose surrounding relationship with said hub, radially flexible means extending between said shoe and said driven member and positively coupling said shoe and said driven member for rotation in unison while enabling radial contraction of said shoe, a helically coiled spring telescoped over said shoe and having one end secured positively to said driven member to rotate with the latter, said shoe serving as a radial spacer between said spring and said hub and holding the full length of the inner side of said spring out of engagement with said hub at all times thereby to prevent said spring from being wrapped down by said hub when the latter is rotated, and an electromagnetic associated with said driving member and operable when excited to attract the opposite end of said spring axially into engagement with said driving member thereby to cause said spring to wrap down on said shoe and contract said shoe radially into frictional engagement with said hub to transmit torque between said hub and said driven member.

* * * * *